United States Patent [19]

Berkey

[11] Patent Number: 5,307,436
[45] Date of Patent: Apr. 26, 1994

[54] PARTIALLY DETACHED CORE OPTICAL WAVEGUIDE

[75] Inventor: George E. Berkey, Pine City, N.Y.

[73] Assignee: Corning Incorporated, Corning, N.Y.

[21] Appl. No.: 50,509

[22] Filed: Apr. 20, 1993

[51] Int. Cl.$^5$ ............................ G02B 6/00; G02B 6/22
[52] U.S. Cl. ..................................................... 385/123
[58] Field of Search ................. 385/122, 123, 125, 126

[56] References Cited

U.S. PATENT DOCUMENTS

| | | | |
|---|---|---|---|
| Re. 28,664 | 12/1975 | Miller | 350/96 |
| 4,478,489 | 10/1984 | Blankenship et al. | 385/123 X |
| 4,630,889 | 12/1986 | Hicks | 350/96.30 |
| 4,634,218 | 1/1987 | Hicks, Jr. | 385/123 |
| 5,052,778 | 10/1991 | Jamsid | 385/123 X |
| 5,056,888 | 10/1991 | Messerly et al. | 385/123 |
| 5,067,831 | 11/1991 | Robbins et al. | 385/123 |
| 5,149,349 | 9/1992 | Berkey et al. | 65/3.11 |
| 5,180,410 | 1/1993 | Berkey | 65/3.11 |

Primary Examiner—Ake E. Ullah
Attorney, Agent, or Firm—Bruce Kamerer

[57] ABSTRACT

An optical waveguide fiber is made substantially bend less resistant by providing a core member partially detached from a cladding member. A core rod is suspended within a cladding preform. The assembly is heated and drawn into a waveguide fiber. The partial detachment is achieved by proper choice of preform dimensions and drawing parameters. Alternatively, a positive pressure may be applied to the preform interior to produce the partial detachment. The partial detachment of the core member from the cladding substantially isolates the core member from external forces, thereby making the waveguide substantially bend resistant. The preferred detachment fraction is more than 95% of the core member periphery. Essentially any waveguide which can be fabricated using a core rod inserted in a cladding tube, can be made to have a partially detached core member. The waveguide types to which the invention applies include single mode, multimode and polarization retaining single mode. To obtain further core member isolation, a waveguide may be fabricated which has a first cladding partially attached to a second cladding and the core member partially attached to the second cladding. Making bend resistance intrinsic to the waveguide, allows greater freedom in choice and application of waveguide coatings and cable designs.

19 Claims, 4 Drawing Sheets

PARTIALLY DETACHED CORE OPTICAL WAVEGUIDE

FIELD OF THE INVENTION

This invention pertains to a substantially bend less resistant optical waveguide fiber having a partially detached core region and a method for manufacturing this optical waveguide fiber for use in both telecommunications and sensor applications.

BACKGROUND

Early in the development and testing of optical waveguide fiber, the impact of external forces on waveguide properties was studied and quantified. Both large and small radius bends (macrobending and microbending respectively), relative to the wavelength of light propagated, can cause power to be coupled out of the waveguide, thereby increasing attenuation. In the case of multimode waveguides, bandwidth can be increased or decreased by bending the waveguide. In the case of single mode fiber, bending can change the waveguide cut-off wavelength and can introduce local changes in refractive index, an effect called stress optic birefringence. Stress optic birefringence in turn can cause increased coupling between the two polarization modes propagated in the fiber. For applications, such as gyroscopes and other sensors, where maintenance of a particular polarization is of critical importance, bend induced stress optic birefringence can essentially render the waveguide inoperative. The need to prevent or limit this detrimental behavior is therefore clear.

Methods for insulating or isolating the waveguide from external forces, which can produce detrimental bending effects, typically involve waveguide coatings having a low elastic modulus, or cable designs which do not allow bending to occur or do not transmit bending to the encased waveguide. The combination of low modulus coatings with protective cable designs has produced waveguide cable with acceptable performance over a wide range of applications and environmental conditions.

However, there are difficulties and costs which accompany these solutions to the waveguide bending problem. In the case of coatings, the application process must yield a coating of uniform thickness and density to prevent the coating itself from inducing waveguide bending. Manufacturing cost and throughput are thereby adversely affected. Also, for essentially all coatings, the coating modulus changes with temperature, which means that the bend less resistance of the waveguide/coating combination can vary with temperature. A second, higher modulus coating applied over the low modulus coating is usually required to protect the waveguide from abrasion and thereby maintain strength. This second coating must bond to the first coating and be applied uniformly and homogeneously, so that the second coating provides protection without inducing waveguide bending. Again, cost and manufacturability are adversely affected.

Cable designs which resist bending or protect the fiber from external forces, which may induce bending, in general require additional components such as slotted cores or plastic tubes. Thus, these designs are more costly and usually result in a cable having increased diameter and weight.

Furthermore, there are applications where tolerances on waveguide properties, environmental requirements or cable size and weight requirements are such that the coating and cable designs described above do not insure adequate performance.

The present invention is distinct from the prior art, as described below.

Miller, U.S. Pat. No. Re. 28,664 describes an optical waveguide fiber with a cross section having spaces between a central light carrying member and a peripheral supporting structure. The central member is attached to the peripheral structure by means of two or more thin films extending therebetween. The central member, the supporting structure and the thin films are all fabricated from the same material. The air or vacuum surrounding most of the central member acts as the lower index "cladding" required to confine light to the central member. The problem addressed in U.S. Pat. No. Re. 28,664 is that of constructing an optical waveguide suitable for telecommunications, i.e., low attenuation. Bend less resistance is not addressed.

Both Hicks, U.S. Pat. No. 4,630,889 and Hicks, U.S. Pat. No. 4,634,218 describe polarization maintaining waveguides with a cross section having spaces between a central member and a surrounding structure. As in U.S. Pat. No. Re. 28,664, the entire central member, i.e., the light carrying member, is composed of the same material. The index difference, required to define a light guiding core region, is achieved by holding the center member or members under stress. In general, the relative thermal expansion coefficients and geometry of the central member or members, compared to the surrounding structure, are chosen such that, in final configuration, the surrounding structure of the waveguide places a compressive load on the central member or members. The contours of the resulting stress field define the refractive index gradient and thus establish the polarization maintaining feature. Any bend less resistance of this waveguide is due to directional compressive loading, rather than isolation of the central structure from its surroundings.

SUMMARY OF THE INVENTION

An object of the invention is to provide a waveguide having superior insensitivity to external forces, without the disadvantages of the prior art. Another object of the invention is to provide a relatively bend insensitive waveguide, which allows greater flexibility in the choice of coating materials and cable designs. Yet another object of the invention is to provide a relatively bend insensitive waveguide, wherein the bend insensitivity is intrinsic to the waveguide, and thus not susceptible to changes in properties of external materials, such as the coating or cable members. A further object is to provide a relatively bend insensitive design, applicable to essentially all waveguide types, including multimode, singlemode and polarization maintaining waveguides.

Broadly, the present invention is a waveguide, and a manufacturing method which provides a waveguide, having a core member and a surrounding cladding member, wherein the core member is partially detached from the cladding member. Both the core member and the cladding member are comprised of materials transparent to a range of light wavelengths. The core member is comprised of a first material and a second material, integral with and surrounding the first material, wherein the refractive index of the first material is higher than that of the second material. In its final configuration, the waveguide exhibits a gap between a significant portion of the core member perimeter and the cladding member, which gap serves to largely isolate the core from external forces applied to the cladding. Preferably this gap is more than 50% and less than 99.9% of the core member perimeter.

The invention may be used with any optical waveguide fiber which is fabricated using separate core and clad preforms. Since essentially all waveguides, e.g., multimode, singlemode and polarization maintaining waveguides, may be fabricated using separate core and clad preforms, the invention has wide applicability.

In a preferred embodiment, analogous to methods described in Berkey et al., U.S. Pat. No. 5,149,349 and Berkey, U.S. Pat. No. 5,180,410, incorporated herein by reference, a core rod, which is precursor to a waveguide core member, is drawn from a preform. The preform types include those for multimode, singlemode and singlemode polarization retaining waveguides. For example, a core rod preform may be prepared by depositing and consolidating glass soot on a surface of a tube or rod, by any of the methods known to those skilled in the art, including CVD, MCVD, VAD and OVD. To yield a core member, as described above, the core rod is comprised of a first material and a second material, integral with and surrounding the first material, wherein the refractive index of the first material is higher than that of the second material. A cladding preform, which is precursor to the cladding member, may be prepared by any of the methods mentioned in reference to the core rod preform. The final form of the cladding preform, in this embodiment, is a tube.

The preform for drawing a waveguide fiber is prepared by sealing a handle to the periphery of the cladding tube. The core rod is fixedly positioned within the cladding tube. The cladding tube and core rod are of approximately equal length and have cross sections dimensioned to provide a gap to between tube and core rod. A minimum gap of about 1 mm between the core rod and cladding tube is in general sufficient to produce the desired core member to cladding gap in the finished fiber.

This preform is inserted into a draw furnace and the preform tip, i.e., the preform end distant from the handle, is brought to its softening temperature and drawing of the waveguide fiber is started. In the first several minutes of drawing, the waveguide produced is essentially solid, that is, no gap exists between the core and cladding members. As draw speed increases, a gap may be caused to form between the core member and cladding member by a suitable mechanism, e.g., increasing the pressure in the interior of the preform. More specifically, the air pressure between the core rod and cladding tube is increased to a value above ambient. The increased interior pressure causes a part of the spacing (or gap) between core rod and cladding tube to persist as the preform is drawn to the final dimension of the waveguide. This pressure increase may be accomplished by flowing a gas through the handle into the space between the core rod and cladding tube. A pressure of about 2 to 3 cm of water is sufficient to establish and maintain this gap. Surprisingly, it was found that once this gap was established, by means of increased internal preform pressure, the gap did not disappear when the internal pressure was allowed to return to ambient. More surprisingly, it was found that as draw speed was increased to about 2 m/sec, a gap between the waveguide core member and cladding was established and persisted during the drawing of the complete preform when no positive pressure was introduced, at any time, into the space between core rod and cladding tube of the preform.

The method described above may be iterated a number of times, within the limits of practical considerations such as draw furnace size and handle design, to yield a waveguide having multiple cladding layers with multiple gaps therebetween. Thus, incremental bend insensitivity may be realized by fabricating a preform having a first cladding tube into which a second cladding tube is inserted.

In a preferred embodiment, the first cladding tube, the second cladding tube and a core rod are fused to a handle. In the fusing step, only a part of the periphery of an end of the second clad tube and an end of the core rod are fused to the handle. Thus, the spaces between the two tubes and between the second tube and the core rod communicate with a hole through the handle body. The first and second tubes are sized to allow a clearance of about 1 mm between the I.D. of the first tube and the O.D. of the second tube. The core rod is sized to fit within the second cladding with a clearance of about 1 mm between the rod O.D and the tube I.D. The preform so constructed is drawn as described hereinbefore. Again, while a positive pressure may be applied to the interstices of the constructed preform to initiate and maintain gaps between the first and second cladding and between the second cladding and the core rod, it was found that a gap between the first and second cladding and between the second cladding and the core member of the waveguide was established and persisted when draw speed reached about 2 m/sec, with no pressurization of the preform interior spaces.

Each additional cladding structure increases the isolation from external forces of the light carrying portion of the waveguide, i.e. the core member, and thus improves the bend insensitivity of the waveguide.

The segment of attachment between corresponding waveguide members must be small enough to provide isolation from external forces but large enough to prevent relative movement, in the longitudinal direction, among the waveguide members. The segment of attachment is preferably more than 0.1% but less than 50% of the perimeter of the smaller of the two corresponding members.

Bend testing, described hereinafter, shows the superior bend insensitivity of the isolated or semi-detached core waveguide.

DETAILED DESCRIPTION OF THE INVENTION

The figures are intended as aids in describing the invention and are not necessarily precise or drawn to scale. Also, the drawings of draw preforms and of a draw preform in a draw furnace are schematic in nature and are not scaled to the actual size of the preforms and draw equipment.

In the representations of semi-detached core waveguides, shown in FIGS. 1-4, the maximum dimension of the core member and the I.D. and O.D. of the cladding members are chosen, in conjunction with the core member refractive index differences, to produce a target combination of waveguide cut-off wavelength, core radius and cladding radius. In the preform, the maximum dimension of the core rod is about 1-2 mm less than the minimum inside dimension of the adjacent cladding tube. Also, in the case where a first and second cladding tube are used, the maximum outside dimension of the second tube is chosen to be about 1-2 mm less than the minimum inside dimension of the first tube. For purposes of practicing the present invention, an important dimension is the spacing between the elements of the preform, as this spacing is a primary factor in determining the fraction of the periphery of an element which is detached from its corresponding element. The optimum spacing between elements, i.e., the spacing which yields minimum inter-element attachment is determined experimentally, starting with a spacing of about 1 mm. Also, the dimensions of the preform elements depend upon the target parameters of the finished waveguide. The preferred material for core and cladding members is a silica based glass.

Figure 1:
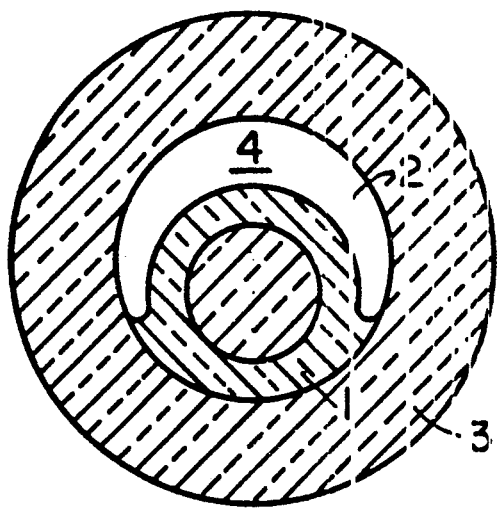
FIG. 1 is a cross section of a single mode fiber with a semi-detached core member and a single cladding.
Figure 2:
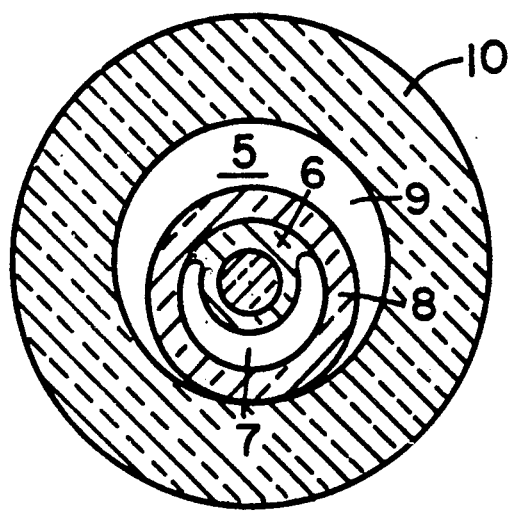
FIG. 2 is a cross section of a single mode fiber with a semi-detached core member and a first and second cladding.

FIGS. 1 and 2 represent a number of waveguide designs including, single and double clad single mode, multimode and polarization maintaining waveguides. Each of these waveguide types may be made using the core rod and cladding preform process described herein.

For essentially all waveguides represented by FIG. 1, core member 1 is fused to cladding 3 only along a segment of the periphery of core member 1, thereby leaving a gap 2 between core member 1 and clad 3. The core member is comprised of a first material and a second material, integral with and surrounding the first material, wherein the refractive index of the first material is higher than that of the second material. Gap 2 is present for the entire length of waveguide 4 and, since the segment of attachment between core 1 and clad 3 remains largely constant over the length of waveguide 4, gap 2 maintains a fairly constant size and shape over the length of waveguide 4. The size of the segment of core 1 fused to clad 3 is determined by a number of interacting factors including, e.g., the relative viscosity of core and clad glasses, draw furnace temperature, draw speed, draw preform geometry and, to a lesser extent, preform internal pressure described hereinbelow.

Isolation of the core member from external forces improves as the area of attachment between core and cladding members decreases. The area of attachment need only be large enough to prevent relative movement between core and cladding members. Such relative movement could result in abrasion, and thus, weakening, of the waveguide members. Bend resistance improvement begins when a relatively small fraction, for example, about half, of the core member periphery is detached. A detachment percentage between about 50% and 99.9% of the core member periphery should be achieved, with the preferred range between about 95% and 99.9%.

Waveguides represented by FIG. 2 include single mode, multimode and polarization maintaining waveguides. Additional core isolation from external forces is provided by an additional semi-detached cladding layer. Referring to FIG. 2, only a segment of the periphery of core member 6 is fused to clad 8 along the length of waveguide 5. Also, only a segment of the periphery of clad 8 is fused to clad 10 along the length of waveguide 5. The gaps 7 and 9, which are present along the length of waveguide 5, serve to provide a double isolation of core member 6 from external forces. That is, the stress fields set up in clad layer 10 are only partially transmitted to clad 8, because of the limited contact between the two clads. Likewise, stress fields experienced by clad 8 cannot be fully transmitted to core member 6 due to the limited area of contact between these two waveguide parts. The area of attachment between core member 6 and clad 8 may occur at any part of the inside surface of clad 8. Also, the orientation of the area of attachment between clad 8 and clad 10 may occur at any part of the inside surface of clad 10. In general, the area of attachment of clad 8 to clad 10 and the area of attachment of core member 6 and clad 8 do not influence one another.

Figure 3:
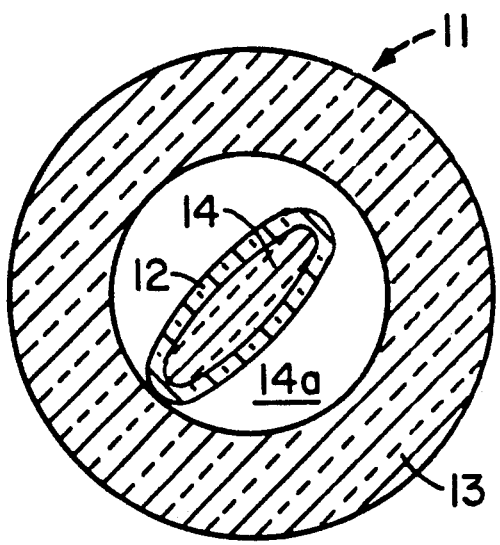
FIG. 3 is a cross section of a polarization maintaining waveguide with a semi-detached core member and a single cladding.

Illustrated in FIG. 3 is a preferred embodiment of a polarization maintaining waveguide, wherein the core member form and function is taught in Berkey, U.S. Pat. No. 5,180,410. Singly clad waveguide 11 has a core member 12, which is elliptical in shape. Further, the center region 14, of core member 12, is elliptical in shape. The area of attachment between core member 12 and clad member 13 is between about 1% and 50% and preferably between about 1% and 10% of core member 12 periphery. Substantial isolation of core member 12 from external forces, such as bending forces, prevents stress induced birefringence in the core member, thereby preserving the launched polarization mode. The cross section of waveguide 11, including the size and shape of gap 14a is essentially unchanged for the waveguide length.

Figure 4:
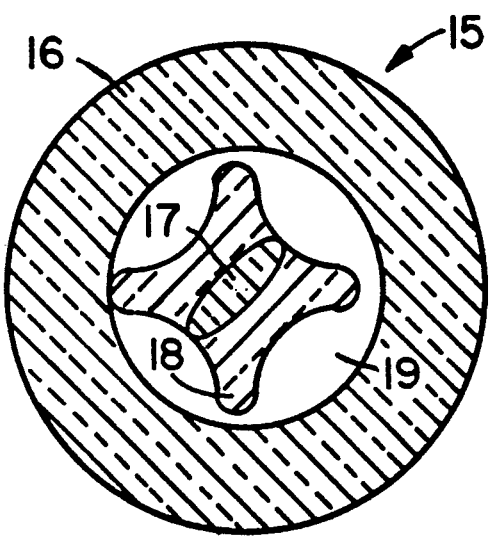
FIG. 4 is a cross section of a polarization maintaining waveguide with a semi-detached core member and a single cladding.

FIG. 4 illustrates another embodiment of a polarization maintaining core member. Waveguide 15 has a lobed core member 18 and an elliptical core member center region 17. As described in Berkey et al., U.S. Pat. No. 5,149,349, this core member configuration provides a polarization maintaining waveguide. In general, core member 18 and clad 16 are of such relative size that, in the drawing process, core member 18 is fused to clad 16 along at least one segment of a core lobe. Fusion of segments of additional lobes to the cladding may occur. However, fusion of only one lobe segment is preferred to provide maximum core member isolation. With the relative core member and cladding member sizes, given hereinabove, attachment at only one lobe segment may be expected. Again, the fused segment exists for the entire length of waveguide 15 and the cross sectional geometry shown in FIG. 4 is essentially constant along the waveguide length.

The waveguides illustrated in FIGS. 3 and 4 may also be fabricated in the double clad configuration as described for FIG. 2, hereinabove.

For the waveguides illustrated in FIGS. 1-4, the gaps, indicated, for example, by 2, 7, 9, 14a and 19, form and remain substantially constant in size and shape when particular combinations of draw furnace temperature and draw speed are reached and maintained. These gaps may also be opened and maintained by increasing the pressure, to about 2-3 cm above ambient, within the preform by flowing a gas through the handle into the preform during the drawing process. Alternatively, a gap may be initiated by increasing pressure within the preform and subsequently allowing internal preform pressure to return to ambient. Typically, the cross sections of FIGS. 1-4 remain substantially constant in size and shape for draw furnace temperatures in the range 1900 to 2300 degrees C. and draw speeds near or above about 2 m/sec.

Figure 5:
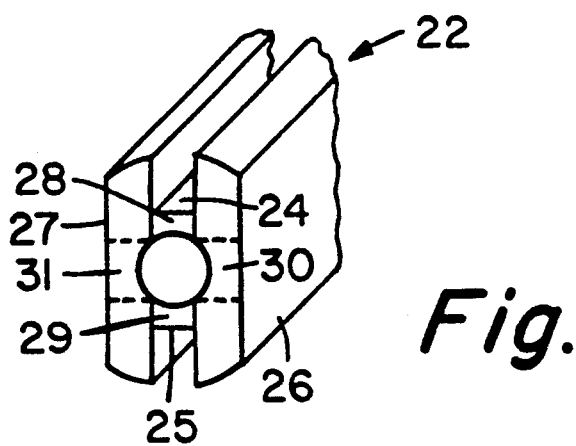
FIG. 5 is a cross section of a core preform for the polarization maintaining waveguide of FIG. 4.

Turning now to a description of the manufacturing method, reference is made to FIG. 5. FIG. 5 illustrates a perspective view of a core preform 22 from which is produced a core rod, which is a precursor to core member 18 in FIG. 4. Core preform 22 derives from a conventional preform of circular cross section. Preform 22 may be made by any of several means familiar to those skilled in the art. For example, preform 22 may be formed by starting with a preform of circular cross section, which circular preform is made by any of several fabrication techniques, including outside vapor deposition, axial vapor phase deposition and modified chemical vapor deposition. Preform 22 is, in general, composed of at least two glass compositions, which may be deposited sequentially in the fabrication step, one composition for the center region and a second composition for the surrounding region. The refractive index of the center glass is higher than that of the surrounding glass. Notches 24 and 25 are sawed into opposing segments of the circular core preform. At approximately 90 degrees of arc from the center of each notch, the circular core preform is ground to form the approximately flat sides 26 and 27. The notches can be of various widths, ranging from about 0.5 cm to about 2.5 cm. The depth of the notches is such that the vertical dimension of areas 28 and 29 is about 0.1-1 mm. The notch cross section can be any of a number of shapes including, triangular, circular, rectangular or rectangular with rounded corners. The size reduction due to the grinding of the preform sides may vary from zero to about half the preform diameter.

In a preferred embodiment, the dimension from side 26 to 27 is about 3 times the minimum dimension between the bottoms of notches 24 and 25. Also, the ratio of height of side 26 or 27 to thickness from side 26 to 27 is between 1.5 and 3. The core center has a higher refractive index relative than the surrounding glass, as described hereinabove. The volume of glass 30 and 31 defined by the region between the core center and the ground sides 26 and 27 is about 2.5 times the volume of glass 28 and 29 defined by the region between the core center and the preform notches. With the core preform so configured, it may be heated and stretched to form a core rod approximating the shape of a block H. When the core rod center region is circular in cross section, the core member center region will be elliptical. One embodiment has the following dimensions for the stretched code rod: ~5 mm for the dimension corresponding to the height of sides 26 and 27; ~3 mm for the dimension corresponding to the width from side 26 to side 27; and ~1 mm for the dimension corresponding to the distance from the bottom of notch 24 to the bottom of notch 25. Other configurations of core preform 22 would yield core rods with dimensions different from this embodiment. However, these different core rods could still yield polarization maintaining fiber after drawing, provided the configurations are such that the core member center is elliptical.

It should be understood that any of several polarization maintaining core members may be used according to the present invention. In particular, the preferred embodiment of FIG. 3 has a core member which derives from the flattened preform process taught in Berkey, U.S. Pat. No. 5,180,410. The stress rod preform, as taught in Berkey et al., U.S. Pat. No. 5,149,349, also yields a core member compatible with the present semi-detached core member invention.

Figure 6:
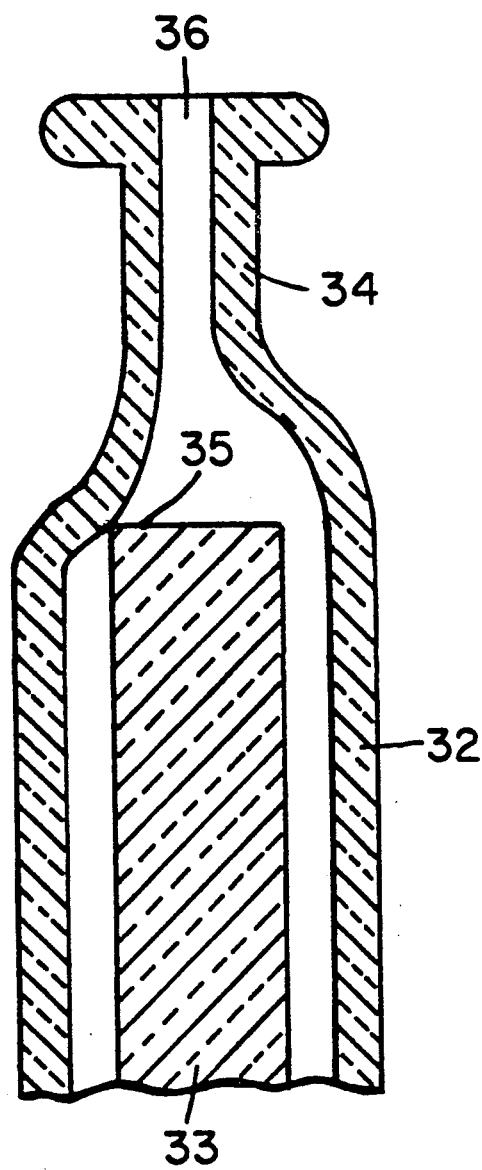
FIG. 6 is a vertical section of a single clad preform.

The assembled draw preform for a single clad, semi-detached core waveguide is illustrated in FIG. 6. Clad tube 32 is manufactured to the required dimensions, dictated by the specification of the final waveguide, using any of the methods known to those skilled in the art. Core rod 33 is inserted into the tube and rod end 35 is fused either to the inside, upper portion of the tube wall or to the inside of glass handle 34. A torch may be used to carry out the core rod fusion. Core rod end 35 is fused to the body of the draw preform only along a part of the periphery, so that the space between core rod 33 and tube 32 may be accessed through the opening 36 in handle 34. The segment of the handle or upper tube where core rod 33 is fused may be deformed by the applied heat so that the core rod length is suspended freely inside the clad tube 32. Core rod 33 need not be suspended along the draw preform centerline.

Figure 7:
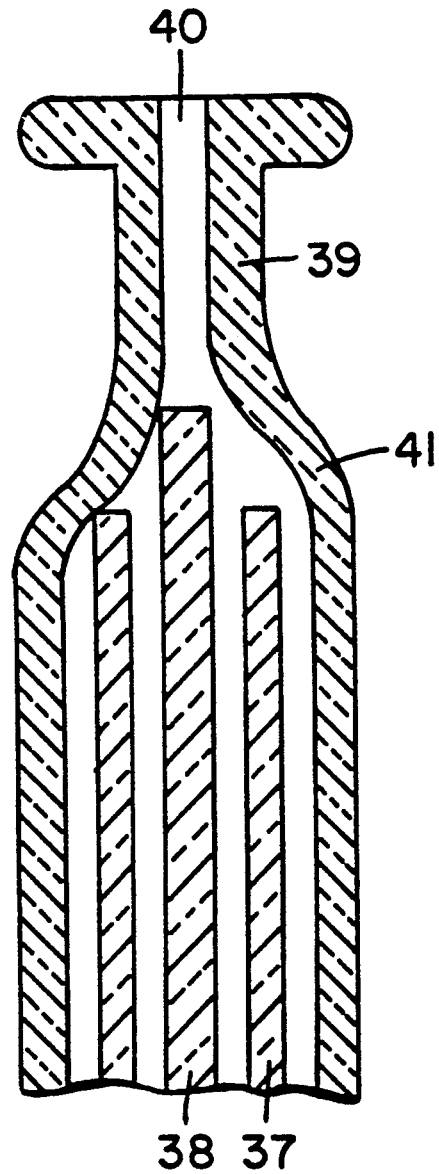
FIG. 7 is a vertical section of a double clad draw preform.

A double clad draw preform is illustrated in FIG. 7. Outer clad tube 41 and draw handle 39 are configured as in FIG. 6, described hereinabove. The inner clad tube 37 is cut to the draw preform length, which is determined largely by the length of the outer clad tube 41. The inner clad tube 37 and the core rod 38 are inserted into clad tube 41 and fused to handle 39 or to the upper portion of clad tube 41, as shown. Only a part of the periphery of inner clad 37 and core rod 38 are fused to handle 39 or to clad wall 41 so that the spaces between clad 41 and clad 37 and between clad 37 and core 38 communicate with opening 40 in handle 39. During the step of fusing clad 37 and core rod 38 to the draw preform, the area of attachment may be deformed so that the core rod and inner clad tube are freely suspended within clad tube 41.

In either the configuration illustrated in FIG. 6 or FIG. 7, the core rod may be of single mode, multimode or polarization retaining single mode design.

Figure 8:
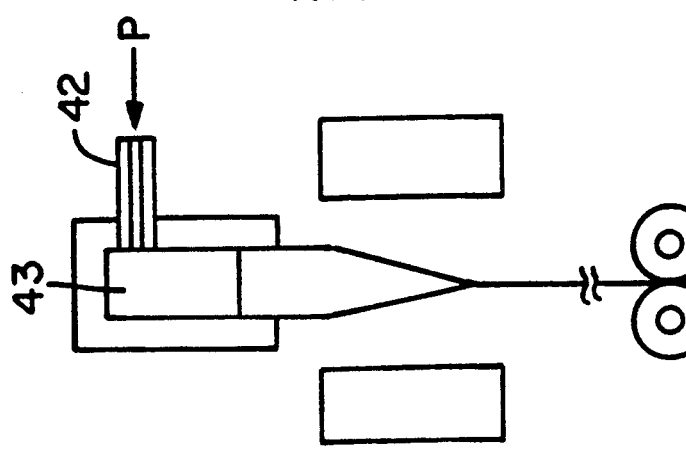
FIG. 8 is an illustration of a draw preform in a draw furnace with means for applying a positive pressure to the space between the parts of the preform.

Drawing of the assembled preform is schematically represented in FIG. 8. Tube 42, shown attached to handle 43, provides means for raising the blank interior pressure above ambient. During draw, the draw preform tip enters the draw furnace hot zone, which may be controlled at a temperature between 1900 and 2300 degrees C. The component glasses soften and flow together, so that a solid glass strand may be drawn from the tip and inserted into a motor driven drawing mechanism. As drawing proceeds, the outside diameter of the waveguide is controlled by controlling preform feed rate into the hot zone, draw speed and furnace temperature.

In the case of single clad waveguides, the gap between the core member and the cladding may be opened by using tube 42 as an access port to apply pressure to the space between the cladding tube and core rod of the preform. Surprisingly, once the gap has been established by means of flowing a gas through tube 42 into the space between core rod and cladding tube, thereby establishing a positive pressure, the gap persists even when the pressure is allowed to return to ambient level. Thus, positive interior pressure does not have to be maintained throughout the drawing process. More surprisingly, it is found that the gap forms and persists, even when no positive pressure is applied to the preform interior, once the draw speed reaches about 2 m/sec. Higher draw speeds are realizable by adjusting preform feed rate and furnace temperature such that target geometry is met.

This same phenomenon of gap initiation and persistence, without application of positive pressure to the preform interior, was observed for the double clad configuration.

Examples of cladding tube and core rod dimensions which yield waveguides similar to those illustrated in FIGS. 1-4 follow.

EXAMPLE 1

A single mode polarization maintaining waveguide with about 80 micron cladding diameter and about 1300 nm cut-off wavelength was fabricated as follows.

As taught in Berkey, U.S. Pat. No. 5,180,410, an elliptically shaped rod was stretched from a preform. The maximum rod dimension was ~5 mm. A clad tube of I.D. ~6 mm and O.D. ~25 mm was fabricated and one end was fused to a hollow glass handle. The core rod was inserted into the clad tube and a part of the periphery of one end of the rod was fused to the inside wall of the glass handle.

The assembled preform was lowered into a draw furnace having a hot zone temperature of about 2100 degrees C. The preform tip softened and the preform components flowed together so that a solid glass gob, having a trailing solid glass filament, dropped from the preform tip.

The glass filament was threaded into a drawing and wrapping mechanism. Preform feed rate was set to allow a draw speed of about 2 m/sec.

As draw speed increased toward target, the core member to clad member gap was established and persisted throughout drawing. No internal pressure was applied to the preform interior at any time. Drawing at constant speed of about 2 m/sec was continued for the remainder of the preform.

The resulting optical waveguide had a cross section as illustrated in FIG. 3., with clad diameter about 80 microns and core dimensions as described in Berkey, U.S. Pat. No. 5,180,410.

EXAMPLE 2

A single mode step index waveguide with 125 micron cladding diameter and about 1290 nm cut-off wavelength was fabricated using the following components and method.

A core rod preform composed of a center glass of germania doped silica and a surrounding glass of silica was stretched to a circular cross section core rod of diameter ~5 mm. A clad tube of I.D. ~6 mm and O.D. ~53 mm was fabricated and one end fused to a hollow glass handle. The core rod was inserted into the clad tube and a part of the periphery of one end of the rod was fused to the inside wall of the glass handle.

The assembled preform was lowered into a draw furnace having a hot zone temperature of about 2100 degrees C. The preform tip softened and the preform components flowed together so that a solid glass gob, haivng a trailing solid glass filament, dropped from the preform tip.

The glass filament was threaded into a drawing and wrapping mechanism. Preform feed rate was set to allow a draw speed of about 2 m/sec.

As draw speed increased through about 0.5 m/sec, a positive pressure of 2-3 cm of water was applied to the blank interior by flowing a gas, in this case air, through the handle, into the blank interior. After target draw speed was reached, the intra-preform pressure was allowed to return to ambient. Drawing at constant speed of about 2 m/sec was continued for the remainder of the preform.

The resulting optical waveguide had a cross section as illustrated in FIG. 1, with clad diameter about 125 microns and core diameter about 9 microns.

EXAMPLE 3

A double clad, polarization maintaining waveguide, with cross section analogous to that shown in FIG. 4, was manufactured using the method and components following.

A core rod preform was prepared by a vapor deposition technique, having a central region and a surrounding region, wherein the central region is of higher refractive index than the surrounding region. Two diametrically opposite notches of about 6.4 mm width were sawed into the consolidated preform, leaving a minimum dimension of about 1 mm of surrounding region material between the bottom of each notch and the core region. Beginning at points on the preform periphery, located at about + and −90 degrees of arc, respectively, from a notch centerline, the preform was ground, leaving opposing flat surfaces on the preform, so that the core preform cross section approximated the shape of a block H.

The sawn and ground preform was heated and stretched to form a core rod with a cross section approximating the shape of a block H, the block H having leg height about 5 mm, leg width about 1 mm, side to side dimension about 3 mm, and cross bar thickness about 2 mm.

A first tube of cladding material, with O.D. about 25 mm and I.D. about 10 mm, was fabricated and fused to a hollow glass handle. A second tube of cladding material, with O.D. about 9 mm and I.D. about 6 mm, was inserted into the larger tube. The core rod was inserted into the second tube. The second tube and the core rod were fused, along a part of the periphery of one end, to the inside wall of the handle or first tube.

The second tube and the core rod were not necessarily centered with respect to each other or the first tube. The assembled preform was introduced into a furnace and drawn as described in Example 1.

The resulting fiber had a cross section as illustrated in FIG. 4.

Figure 9:
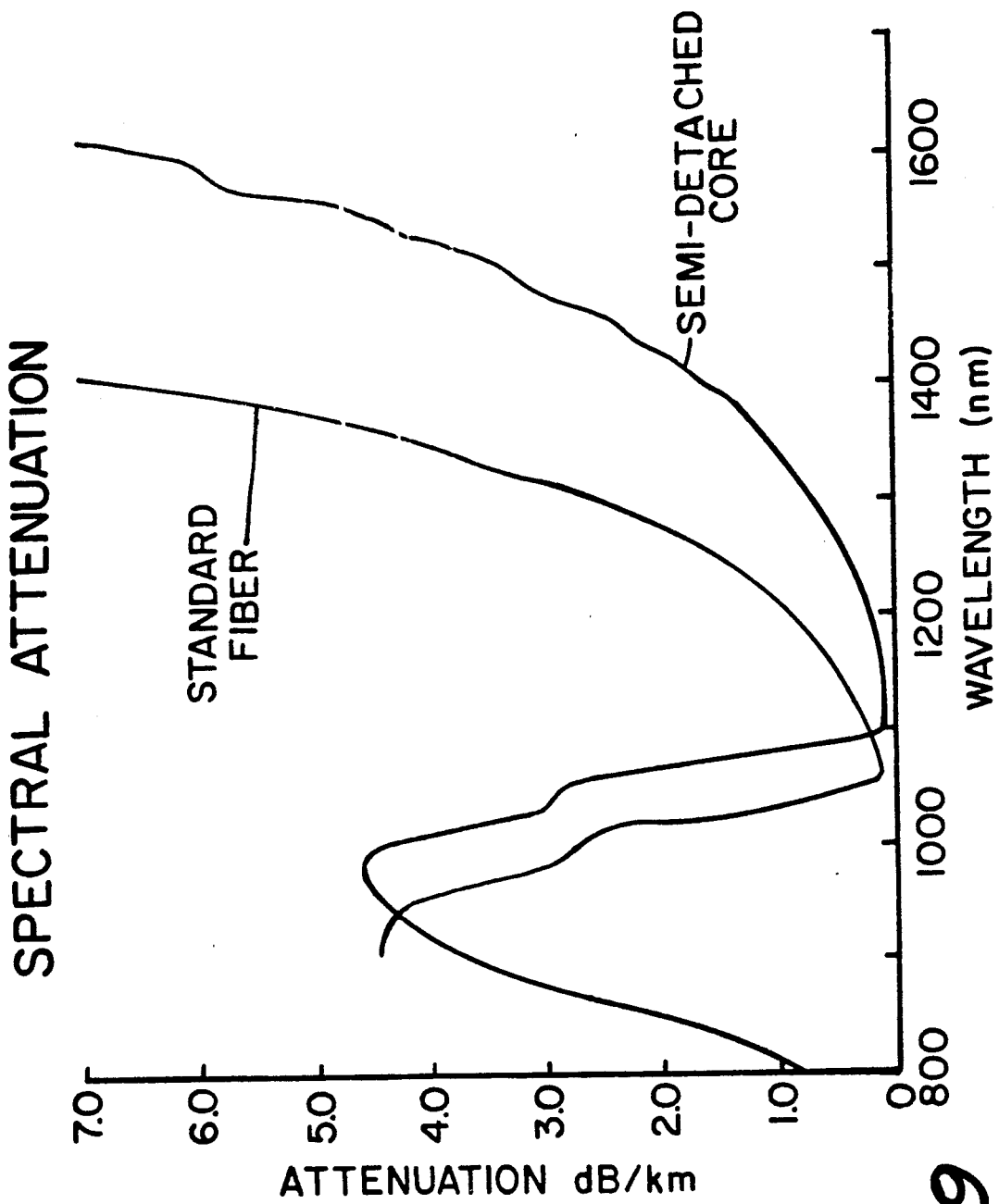
FIG. 9 is a graph of attenuation change with wavelength of two waveguides, one a standard single mode waveguide and one a single mode semi-detached core waveguide, both of which are woven through a series of pegs.

The superior bend insensitivity of a semi-detached core, standard telecommunication type, single mode waveguide is shown in the spectral attenuation curves of FIG. 9. In this chart, the performance of two fibers in a "pin array" test is shown. The "pin array" is a line of 0.66 mm diameter pegs spaced 5 mm apart. A fiber under test is woven on the array such that the fiber touches alternate sides of successive pegs. The test fiber is held under a low tension just sufficient to maintain firm contact between the fiber and pegs. The relative performance of the fiber in bending is determined by finding the attenuation difference between the fiber in an essentially bend free state and the same fiber woven on the "pin array". Attenuation difference is found for a range of wavelengths to yield data for curves as shown in FIG. 9.

Both the standard core and semi-detached core waveguides, whose measurements are depicted in FIG. 9, were drawn from the same draw preform. The semi-detached core had a peripheral gap of about 200 degrees of arc. The bend induced shift to lower wavelengths of cut-off wavelength is more than 100 nm greater for the "non-detached" core fiber. Also the long wavelength bend edge produces 1 dB excess attenuation at about 1200 nm for the non-detached core fiber while 1 dB excess attenuation for the semi-detached core fiber is not reached until about 1350 nm.

Figure 10:
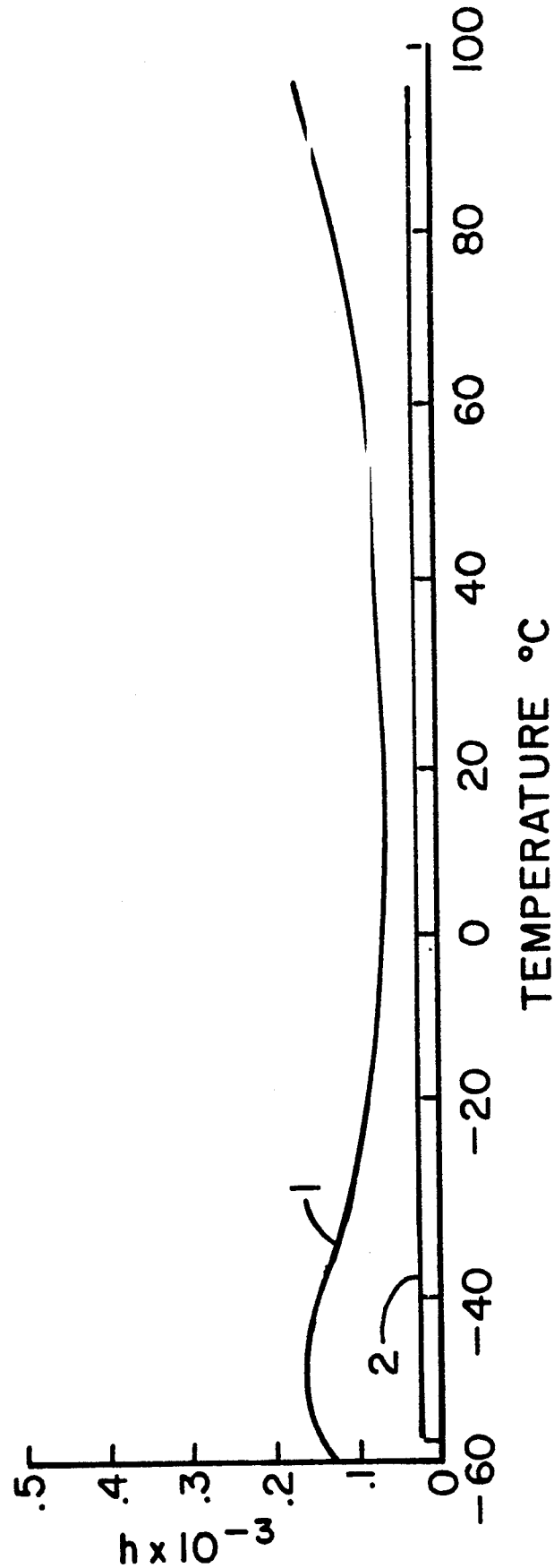
FIG. 10 is a graph of attenuation change with temperature of two mandrel wrapped semi-detached core waveguides.

The bend performance of two semi-detached core polarization retaining waveguides is shown in FIG. 10. The waveguides had a UV curable acrylate protective coating. In this test, about 120 meters of the waveguide was wrapped on a 63 mm diameter mandrel which is 9 mm long. The wind tension was less than 5 grams. The mandrel wrapped waveguide was then taken through a series of temperature cycles while the power in a given polarization mode was measured. Power was launched into one polarization mode. At the exit end of the fiber, power was measured in the other polarization mode, thereby determining the amount of coupling between modes induced by the bending. This relative coupling is expressed in terms of the h factor, shown on the y axis of FIG. 10. A relatively lower h factor indicates less coupling between polarization modes. A temperature cycle begins at room temperature, goes to −60 degrees C. and then to 95 degrees C. The power measurement is continuous. The rate of change of temperature is low enough that the waveguide-mandrel unit is always near thermal equilibrium.

Referring to FIG. 10, curve 1 is coupled power in a waveguide having a core detachment of about 190 degrees of arc. The overall performance is excellent, with only the high and low end temperature regions showing a relative power coupling of 0.2. Curve 2 is for a waveguide from the same preform as that for curve 1. The curve 2 waveguide was drawn to give a core detachment of about 270 degrees of arc. The remarkable result obtained was that the power signal cannot be distinguished from the measurement noise. Also the waveguide of curve 2 had a cross-talk ratio of 38 dB after coiling on the mandrel.

The data in FIGS. 9 and 10, clearly show the superior performance of the semi-detached core waveguide.

Although specific embodiments of my invention have hereinbefore been disclosed and described, it will be understood that the scope of my invention is nevertheless to be defined by the following claims.

I claim:

1. An optical waveguide fiber comprising:
    a core member, comprising a central region and an integral surrounding region, wherein said central region has a higher refractive index than said surrounding region; and
    a clad member disposed about and joined to the length of said core member along a segment of the periphery of said core member, thereby leaving a gap between said core member and said clad member along the length of said optical waveguide fiber wherein said segment of the periphery of said core member along which said clad member and said core member are joined, is less than about 50% and more than about 0.1% of said periphery in axial cross section.

2. The optical waveguide of claim 1 wherein said waveguide is fabricated from a silica glass and said waveguide is configured to be single mode.

3. The optical waveguide of claim 1 wherein said waveguide is fabricated from a silica glass said waveguide is configured to be multimode.

4. The optical waveguide of claim 1 wherein said waveguide is fabricated from a silica glass and said waveguide is configured to be polarization maintaining single mode.

5. The optical waveguide of claim 1 wherein said waveguide is fabricated from a silica glass and said waveguide is configured to be polarization maintaining single mode and has a lobed periphery and wherein said segment is a part of the periphery of at least one lobe.

6. The optical waveguide of claim 2 wherein said central region of said core member has a circular cross section.

7. The optical waveguide of claim 3 wherein said central region of said core member center has a circular cross section.

8. The optical waveguide of claim 4 wherein said central region of said core member center has an elliptical cross section.

9. The optical waveguide of claim 5 wherein said central region of said core member has an elliptical cross section.

10. The optical waveguide of claim 1 further comprising at least one additional clad member surrounding said clad member and joined to a segment of the periphery of said clad member, so that a gap exists between said clad and said additional clad for the length of said waveguide, said joined segment being less than 50% and more than 0.1% and of the periphery of said clad member.

11. The waveguide of claim 10 wherein the core member is selected from the group consisting of a single mode core member, a multimode core member and a polarization maintaining single mode core member.

12. A method of making an optical waveguide fiber comprising:
    providing a core rod having a central region and an integral surrounding region, the refractive index of said central region being greater than the refractive index of said surrounding region;
    providing a hollow clad preform having an inside dimension greater than the maximum outside dimension of said core rod;
    fixedly positioning said clad preform to a handle;
    fixedly positioning said core rod in said clad preform to form a preform assembly; and
    drawing said preform assembly into an optical waveguide fiber having a continuous gap between the portion of said waveguide formed from said core rod and the portion of said waveguide formed from said hollow clad preform.

13. The method of claim 12 wherein said gap is produced by applying positive pressure to said preform assembly interior by flowing a gas through said handle into said gap for at least a part of the drawing step.

14. The method of claim 13 wherein said positive pressure is maintained during the drawing.

15. The method of claim 14 wherein said positive pressure is maintained at about 2 to 3 cm of water.

16. The method of claim 12 wherein said drawing provides a gap more than 50% and less than 99.9% of the periphery of said portion formed from said core rod.

17. The method of claim 12 wherein the step of providing a core rod comprises:

providing a core rod preform;

cutting a pair of diametrically opposed notches into said core member preform;

at points respectively 90 and −90 degrees of arc from the centerline of said pair of notches, grinding flat, parallel surfaces into said core member preform; and heating and stretching said preform to form a core rod.

18. A method of making an optical waveguide fiber comprising:

providing a core rod having a central region and an integral surrounding region, the refractive index of said central region being greater than the refractive index of said surrounding region;

providing a first hollow clad preform having an inside dimension greater than the maximum outside dimension of said core rod;

providing a second hollow clad preform having a minimum inside dimension larger than the maximum outside dimension of said first clad preform;

fixedly positioning said second clad preform to a handle;

fixedly positioning said first clad preform within said second clad preform;

fixedly positioning said core rod within said first clad preform to form a three part preform assembly; and drawing said three part preform assembly into an optical waveguide fiber having a continuous gap between the portion of said waveguide formed from said core rod and the portion of said waveguide formed from said first clad preform and having a second continuous gap between the portion of said waveguide formed from said first clad preform and the portion of said waveguide formed from said second clad preform.

19. The waveguide of claim 18 wherein said second continuous gap is more than 50% and less than 99.9% of the periphery of said portion formed from said first clad preform.

* * * * *